Patented Jan. 23, 1923.

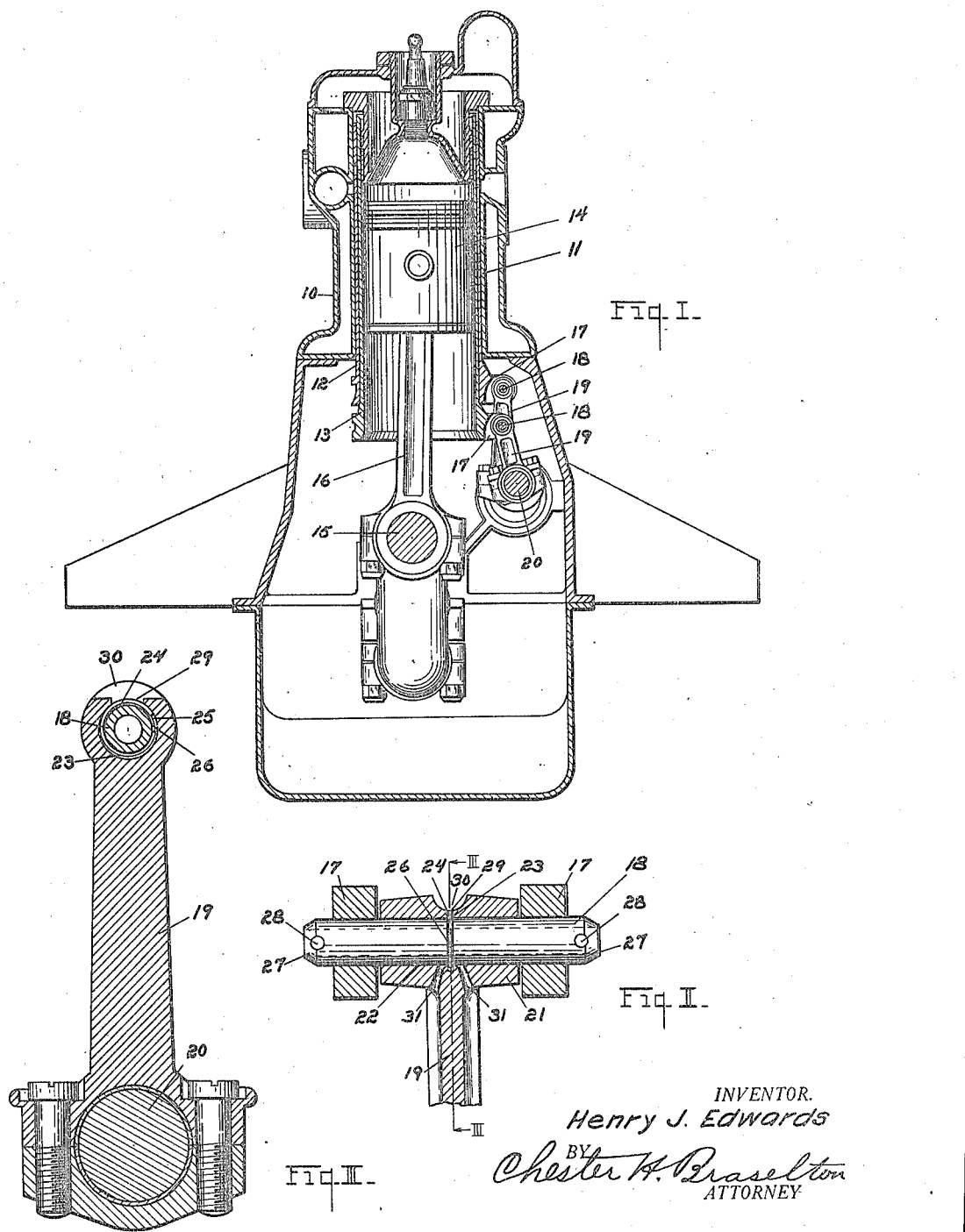

1,443,014

UNITED STATES PATENT OFFICE.

HENRY J. EDWARDS, OF ELYRIA, OHIO, ASSIGNOR TO THE WILLYS-OVERLAND COMPANY, OF TOLEDO, OHIO, A CORPORATION OF OHIO.

PIN-LOCKING MEANS.

Application filed September 16, 1918. Serial No. 254,279.

*To all whom it may concern:*

Be it known that I, HENRY J. EDWARDS, a subject of the King of Great Britain and Ireland, residing at Elyria, county of Lorain, State of Ohio, have invented certain new and useful Improvements in Pin-Locking Means, of which I declare the following to be a full, clear, and exact description.

My invention relates to pin locking means and more particularly to improved means for locking connecting rod pins and the like.

One of the objects of the invention is to provide a pin lock of such construction as to avoid the use of any removable locking devices when it is desired to disconnect the pin from the parts with which it is associated.

Another object of the invention is to provide a pin lock which will positively prevent accidental displacement of the pin when in assembled position, and will permit the same to be driven from its bearings without removing or manipulating the locking means, and which will also permit it to be replaced at any time without preliminary operation upon or handling of the locking means.

Still another object of the invention is to provide a pin lock of simple construction which can be manufactured at a relatively low cost and which is automatic in operation, requiring only the driving of the pin into or out of assembled position with respect to the parts associated therewith.

A further object is the provision of a lock ring mounting such that the ring may be not only readily put into operative position but also may be readily removed in the event that a replacement becomes necessary.

To these and other ends the invention comprises certain novel features of construction and arrangement of parts as will be hereinafter described and claimed, it being understood that the invention is applicable to other forms of construction than that shown in the drawing, and it is not intended to be limited to the specific disclosure embodied herein.

In the drawings, Figure I is a vertical section through a sleeve valve motor showing the application of the invention to the pins of the connecting rods for moving the sleeves of the cylinder in which the gases are exploded.

Figure II is an enlarged detailed sectional view illustrating the manner of locking one of the connecting rod pins shown in Figure I and Figure III is a longitudinal section taken on line III—III of Figure II.

Similar reference characters refer to similar parts throughout the several views of the drawing.

Referring to Figure I of the drawing, I have shown a sleeve valve motor 10 having a cylinder 11 provided with a reciprocally mounted sleeve 12 in which is similarly mounted a second sleeve 13 receiving a piston 14 connected with the crank shaft 15 by the connecting rod 16. Preferably cast integral with the sleeves 12 and 13 are the spaced lugs or bearings 17 for receiving the opposite ends of the connecting rod pin 18, as shown in Figure II. The connecting rod, which is indicated at 19, is mounted upon the cam shaft 20 in the usual manner, and is provided at its upper end with a boss or bearing 21 having a recess or bore 22 for receiving the pin 18 which is preferably of tubular construction. Intermediate the ends of the boss 21 and preferably in the center thereof, is formed an annular groove 23 which is concentric with the bore and adapted to receive the pin locking spring 24, in the form of a coil or split ring, the ends of which are spaced apart a slight amount as indicated at 25, in Figure III. The inner diameter of the coil is slightly less than the diameter of the bore 22 and when the pin 18 is driven into the position shown in Figure II the spring will snap into the annular groove 26 formed in the pin and prevent its accidental displacement or shifting from side to side. The ends of the pin are beveled as indicated at 27 to facilitate its application to the connecting rod and spring.

In assembling the pin, as soon as the groove 26 registers with the groove in the boss 21 the spring, which has been expanded, will contract and snap into said groove, substantially surrounding the pin and will lock the same against accidental displacement, the force required to move the pin from this position being considerable. The diameter of the groove 23 is, of course, made large enough to accommodate the spring when the latter is held expanded by the pin, before the same reaches the position shown in Figure II. The pin may be removed either by striking a blow on the end thereof, or by inserting a punch or other tool in one of the apertures 28 and then striking the punch at a point adjacent to said pin.

In the application of the spring to the annular groove in the connecting rod end, the same may be compressed to a diameter slightly less than the diameter of the bore, and then inserted in one end thereof and forced to the center of the boss when it will expand and snap into said annular groove. Another method of applying the spring member is by feeding it into the groove through the opening 29 at the bottom of the cut 30 in the upper wall of the boss 21, preferably when the pin is in the position shown in Figure II.

It will be obvious to one skilled in the art that the cut 30 and the opening 29 form in effect an oil hole through which oil splashed by the crank and connecting rod may enter the annular groove 26, from which it is supplied to the bearing on either side thereof. A certain amount of oil is also conveyed up to the bearing through the holes 31.

The present invention obviates the use of nuts, cotter pins, and other removable devices for locking the pin in proper position upon its bearings or supports, and requires only the use of a hammer or other suitable tool for driving it into position to permit the release of the connecting rod. The spring always remains in the groove of the connecting rod boss regardless of whether or not the pin is connected with or detached from the rod.

If desired, the groove in the pin may be cut near the end thereof, and the spring-holding groove formed in one of the bearings or supports for said pin, in which case the bore of the connecting rod will be continuous and unbroken.

What I claim is:

1. In a sleeve valve motor, a connecting rod, a connecting rod pin having a bearing therein, said pin and the bore of said rod being provided with oppositely positioned annular grooves, said rod having an opening connecting with the annular groove therein, whereby said pin is retained at all times in said rod, and said groove and said opening in said rod may carry lubricant to said bearing.

2. In a sleeve valve motor, a connecting rod, a connecting rod pin having a bearing therein, said rod being provided with an annular groove in its bore, and with an opening leading down to said groove, said pin being also provided with an annular groove, and a locking ring lying partly in each of said grooves, and removable through said opening, said opening and connecting groove serving to convey lubricant to said bearing.

In testimony whereof, I affix my signature.

HENRY J. EDWARDS.